July 13, 1943.     W. B. FELTON     2,324,202
MACHINE FOR MANUFACTURING MEAT BALLS
Filed Aug. 16, 1939     2 Sheets-Sheet 1
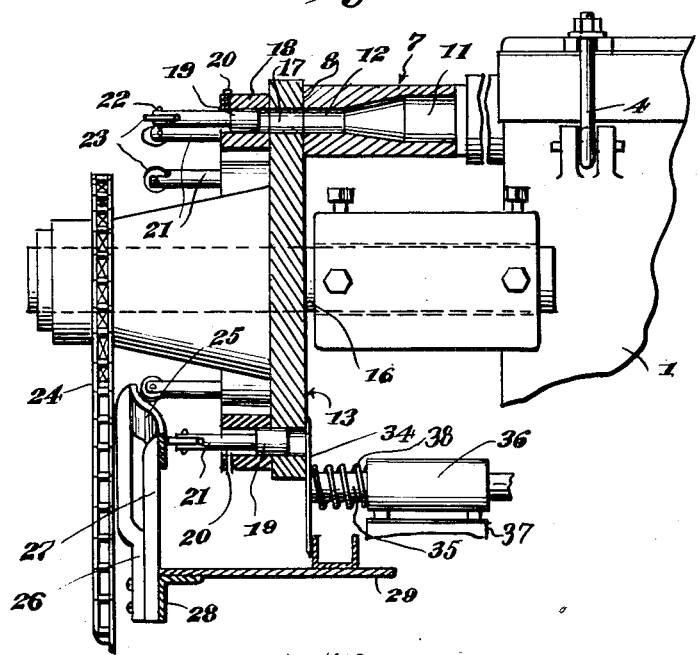
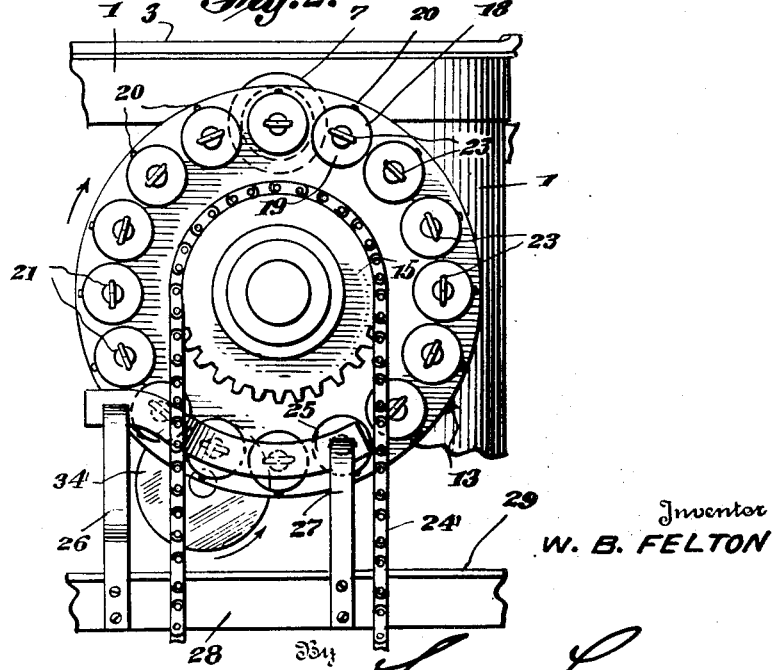
Inventor
W. B. FELTON
Lacey & Lacey, Attorneys July 13, 1943.   W. B. FELTON   2,324,202
MACHINE FOR MANUFACTURING MEAT BALLS
Filed Aug. 16, 1939   2 Sheets-Sheet 2

Inventor
W. B. FELTON
By Lacey & Lacey,
Attorneys

Patented July 13, 1943

2,324,202

UNITED STATES PATENT OFFICE 2,324,202

MACHINE FOR MANUFACTURING MEAT BALLS

Willard B. Felton, Pueblo, Colo., assignor to Nuckolls Packing Company, Pueblo, Colo., a corporation of Colorado Application August 16, 1939, Serial No. 290,526

1 Claim. (Cl. 17—32)

This invention relates to an improved machine for manufacturing meat balls and seeks, among other objects, to provide a machine of this character which will be operative for manufacturing meat balls ready for use, in a speedy and highly efficient manner.

Another object of the invention is to provide a machine for manufacturing meat balls, said machine having a rotatable disk with cylinders thereon and plungers in the cylinders, and a nozzle cooperating with the disk, the cylinders being adapted for receiving a deposit of meat from the nozzle for discharge on a conveyor disposed beneath the disk.

A further object of the invention is to provide an improved method for manufacturing meat balls.

A still further object of the invention is to provide a machine for manufacturing meat balls, said machine having ejecting means selectively cooperating with the plungers for ejecting meat balls from the cylinders as the disk rotates.

A further object of the invention is to provide a machine of this character employing a rotatable knife which cooperates with the disk for removing surplus meat therefrom during rotation of the disk.

A further object of the invention is to provide a machine for forming meat balls which embodies improved cam mechanism for ejecting the meat balls from the disk to fall in a constant stream upon pans located below the disk so that a constant flow of meat balls from the machine will be assured.

A further object of the invention is to provide a machine for manufacturing meat balls wherein the pressure upon the meat at the nozzle will be constant so that the meat balls will be of uniform size.

Other and incidental objects of the invention not hereinbefore called to attention will be apparent during the course of the following description.

In the drawings:

Figure 1 is a side elevation, partly in section, of my improved machine,

Figure 2 is a front elevation of the machine, and

Figure 3:
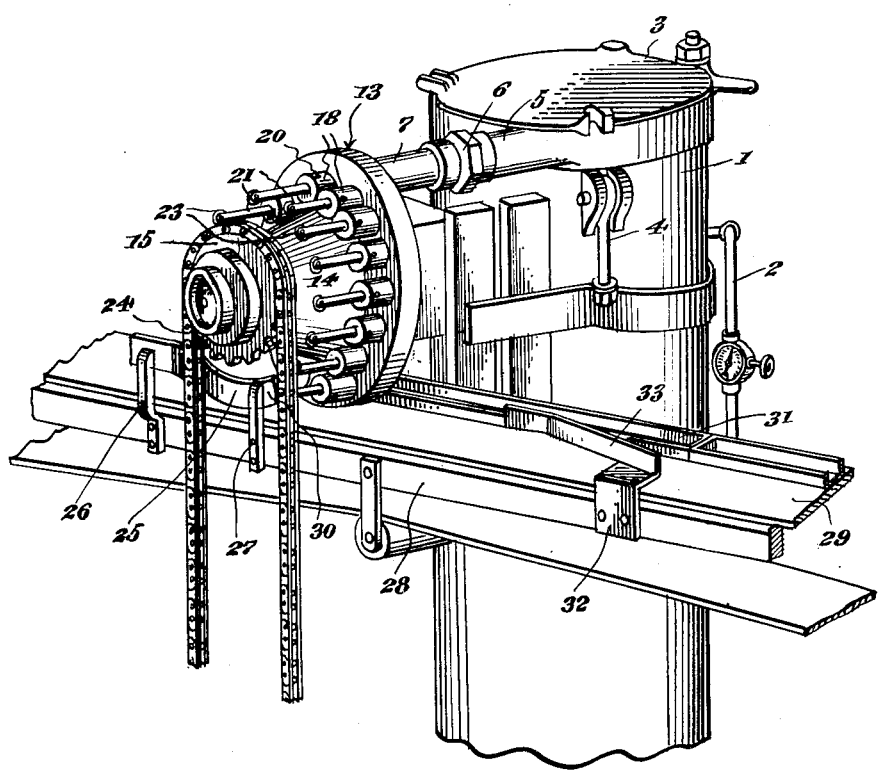
Figure 3 is a perspective view of the machine for forming meat balls.

Referring now more particularly to the accompanying drawings, wherein, as will be seen, similar reference numerals designate like parts throughout the views, the numeral 1 indicates in general a storage tank in which is placed a supply of ground meat which is to be converted into meat balls. The tank 1 has a compressed air supply line 2 connected therewith which compressed air supply will tend to force the meat from the tank in a manner to be presently described. The tank is, of course, provided with a lid or top 3 which is held in place by tie bolts 4.

At the upper end of the tank 1 and extending substantially tangentially therefrom is a discharge pipe 5. The pipe 5 has screwed therein a coupling member 6 which is of any approved construction. The coupling member 6, in turn, is connected with a nozzle which is indicated generally at 7. The nozzle 7, as best seen in Figures 1 and 3 of the drawings, includes a flat front face 8. Also the nozzle 7 is formed with a pocket 11 at its inner end. The pocket 11 is gradually restricted to define a discharge opening 12 which communicates with the flat front face 8 substantially medially thereof.

Mounted to cooperate with the nozzle 7 is a disk which is shown generally at 13. The disk 13 is relatively thick and is provided with a hub 14 which has connected therewith a sprocket 15. The disk, hub and sprocket are mounted on the shaft 16 in such a manner that the disk will be mounted to rotate with its inner surface in substantially confronting relation with the face 8 of the nozzle 7. Formed in the disk 13 is a series of annularly disposed spaced openings 17. The openings 17, as best seen in Figure 1, are positioned to aline with the opening 12 in the nozzle 7. Welded on the outer face of the disk and surrounding the opening 17 are cylinder members 18. It should be understood that means for mounting the members 18, other than welding, can be employed if desired. The cylinder members 18 and the openings 17 cooperate to define cylinders for receiving meat from the nozzle 7. As best seen in Figures 2 and 3, the cylinder members 18 are, of course, arranged in an annular spaced series. Mounted in each of the cylinders is a plunger 19. Each of the plungers is slidable longitudinally in its co-operating cylinder and is limited against outward sliding movement by a stop screw 20. Each of the plungers 19 has an actuating stem 21 which is bifurcated at its outer end to define a yoke 22. A roller wheel 23 is mounted in the yoke 22 by each of the stems 21.

A driving chain 24 is trained about the sprocket 15 and about a driving sprocket of suitable design which is connected with a source of rotative motion. It will now be understood that rotation of the disk 13 by the source of rotative motion will cause said disk to revolve with the cylinders successively and selectively confronting the discharge opening 12 of the nozzle 7. In other words, the nozzle 7 is, in normal operation, always filled with meat and said meat is under pressure. As the disk 13 revolves and the openings 17 come into registration with the discharge opening 12, meat is forced into the cylinders 18. The plungers 19 are forced rearwardly to their full limit and against the stop screw 20. It will now be understood that the cylinders will be filled with meat and said meat will be formed by said cylinders into meat balls.

In order to discharge the meat balls formed by and carried in the cylinders on the disk, I provide cam mechanism which includes a bar 25 which is mounted, by means of brackets 26 and 27 on a frame 28 which forms mounting means for a conveyer belt 29. The bar 25, as will be clearly seen in Figures 1 and 3, is disposed obliquely with respect to the frame 28. Said bar is formed with an upwardly turned cam face 30 which is engageable with the roller wheels 23 on the stems 21 successively as the disk is rotated. As the disk rotates, the cam face engages the stems of the plungers and forces said stems inwardly for ejecting the meat balls from the cylinders. As said meat balls are ejected from the cylinders, they will drop into conveyer pans 31 which are placed on the conveyer belt 29 and are disposed beneath the disk 13. A bracket 32 is mounted on the frame 28 and is provided with a guide tongue 33 which extends above the belt 29 and into engagement with the pans 31. The guide tongue 33 serves the purpose of retaining the pans in proper position beneath the disk 13 when moving along the belt.

At 34, I have shown a circular knife. The knife 34 is mounted on a shaft 35 and is supported by a bearing 36 which bearing is supported by a bracket 37 which is connected with the body of the machine in any appropriate manner. The shaft 35 has a coiled spring 38 thereabout which coiled spring is disposed between the knife 34 and the outer end of the bearing 36, said spring urging the knife 34, as best seen in Figure 1, into engagement with a portion of the flat inner surface of the disk 13. The shaft 35 is adapted to be rotated by the same source of rotative motion as the hub 14. It should be understood, however, that independent rotative means may be employed if desired. The knife 34 will serve the purpose of removing any surplus meat which may be left on the surface of the disk 13 after ejection of the meat balls from the cylinders.

It is thought that the operation of this invention will be thoroughly understood from the foregoing. However, a few more remarks on the subject are not thought to be out of place. It has been found that the machine will operate at highest efficiency when the meat, upon entering the nozzle 7, is at a temperature of about twenty-seven degrees Fahrenheit. The pressure of the meat within the nozzle will be, of course, sufficiently great to urge the plunger 19 rearwardly on the cylinders to the full extent, thus allowing the meat balls to be formed uniformly in each of the cylinders. As the roller wheels 23 successively engage the cam face 30, the meat balls are discharged, as heretofore set forth. The plungers will be allowed to remain in their innermost position until the disk is rotated to such position that the cylinders will confront the nozzles, when the pressure of the meat will again force said plungers into operative position. Of course, the movement of the belt 29 will be synchronized with the rotation of the disk so that the meat balls will be deposited in the pans 31 at a high rate of speed. In actual practice, it has been found that the meat balls may be deposited in the pans at the rate of five hundred and seventy-six per minute. The amount of meat balls desired, as the pressure of meat and the speed of rotation of the disk and the movement of the belt, may be varied to suit individual conditions.

Attention is directed to the fact that the nozzle 7 will be so positioned with respect to the shaft 16 that perfect alinement between the discharge opening 12 of the nozzle and the openings 17 on the disk 13 will be assured.

It is thought that further description of the invention is unnecessary.

Having thus described the invention, what is claimed as new is:

In a machine of the class described, a storage tank, a nozzle connected therewith and receiving a supply of material from the storage tank under pressure, said nozzle having a discharge opening, a disk, cylinder members carried by the disk and being adapted to aline successively and selectively with the nozzle, said cylinder members being adapted to receive material from the nozzle and for forming said material into a predetermined shape, discharge means in each of the cylinder members, a frame beneath the disk, a bar carried by the frame and having a cam face, a conveyer belt carried by the frame beneath the disk, pans carried by the conveyer belt beneath the disk, said discharge means for the material being urged to operate position by pressure of the material from the nozzle and said cam face shifting said discharge means, upon rotation of the disk, for discharging the material to drop in certain of the pans, and a guide tongue mounted adjacent the conveyer belt and selectively engageable with the pans for guiding said pans to a position beneath the disk.

WILLARD B. FELTON.